United States Patent
Archer

[15] 3,673,095
[45] June 27, 1972

[54] OIL AND GREASE ABSORBING COMPOSITION COMPRISING SPHAGNUM MOSS, CALCINED GYPSUM AND PERLITE

[72] Inventor: Ralph H. Archer, 6429 S. W. 36th St., Portland, Oreg. 97221

[22] Filed: July 20, 1970

[21] Appl. No.: 56,736

[52] U.S. Cl. ...................252/88, 106/15 FP, 252/8.1, 252/427, 252/428, 252/440
[51] Int. Cl. .........................C09k 3/22, B01j 1/22
[58] Field of Search.................252/88, 8.1, 427, 428, 440; 117/138, 100 A; 106/110, 114, 115, 15 FP

[56] References Cited

UNITED STATES PATENTS

| | | | |
|---|---|---|---|
| 1,617,343 | 2/1927 | Odell | 252/88 |
| 1,451,485 | 4/1923 | Wootton | 117/138 |
| 1,820,198 | 8/1931 | Randolph | 117/166 |
| 2,496,203 | 1/1950 | Flint et al | 252/378 |
| 2,728,733 | 12/1955 | Hashimoto | 252/449 |
| 1,606,889 | 11/1926 | Mott et al. | 252/427 |
| 1,841,922 | 1/1932 | Steil | 252/427 |

FOREIGN PATENTS OR APPLICATIONS

| | | | |
|---|---|---|---|
| 8,139 | 7/1885 | Great Britain | 117/138 |
| 1,458 | 9/1900 | Great Britain | 117/138 |

Primary Examiner—Douglas J. Drummond
Assistant Examiner—D. J. Fritsch
Attorney—Buckhorn, Blore, Klarquist and Sparkman

[57] ABSTRACT

An oil and grease absorbent composition contains comminuted sphagnum moss as a major ingredient and, as a minor ingredient, a sufficient amount of powdered calcined gypsum to render the mixture fire resistant. A minor amount of a lightweight friction material is also desirably added. A preferred composition is approximately 12 parts by volume of comminuted sphagnum moss and approximately 1 part each by volume of powdered calcined gypsum and heat expanded perlite.

5 Claims, No Drawings

3,673,095

OIL AND GREASE ABSORBING COMPOSITION COMPRISING SPHAGNUM MOSS, CALCINED GYPSUM AND PERLITE

BACKGROUND OF THE INVENTION

Various oil and grease absorbent compositions have been used for removing such oil and grease from garage floors and the like. Thus various materials of organic origin, such as rice hulls and the like have been suggested but, in general, such materials constitute a fire hazard. They also leave the surfaces of smooth floors, such as the surfaces of smooth concrete, in extremely slick and hazardous condition.

In order to overcome the above mentioned deficiencies when materials of organic origin are employed, various oil and grease absorptive inorganic materials have been proposed. Thus materials of volcanic origin such as powdered pumice or tuff have been suggested, the latter material being a sedimentary material composed of consolidated volcanic ash. Substantial amounts of these materials must be employed in order to efficiently absorb the oil and grease and in the amounts employed, are quite expensive to use.

SUMMARY

In accordance with the present invention, composition is provided which is predominantly a material of organic origin rendered substantially fireproof by a powdered inorganic material which forms a minor portion of the composition. Thus it has been found that comminuted sphagnum moss is extremely absorptive of oil and grease and that it can be rendered fire resistant by the addition of a minor amount of powdered calcined gypsum, i.e., plaster of paris. This powdered material adheres to and coats the particles of sphagnum moss such that relative small amounts of the calcined gypsum, for example 1 part of such gypsum to 12 parts of comminuted sphagnum moss by volume, will render the sphagnum incapable of supporting combustion under ordinary ambient conditions.

The mixture of sphagnum moss and powdered calcined gypsum provides a very substantial improvement over the inorganic materials previously employed in compositions for absorption of oil and grease, and is also an improvement over the organic materials previously employed in that the gypsum does to some extent reduce the slipperiness of floors upon which the composition has been employed. It is, however, desirable to still further reduce the slipperiness of such floors by incorporating a powdered friction material into the composition. Small amounts of the inorganic materials employed for compositions above discussed, such as powdered pumice or tuff can be employed for this purpose. A much more effective material is, however, a heat expanded perlite which has been largely reduced to powdered form. Perlite is a well known mineral material. It is a hydrous volcanic glass containing 3 to 4 percent water. It can be expanded by heating into a lightweight porous material used commercially as a lightweight aggregate, particularly in gypsum plasters. It can be easily reduced to a powdered form and is an excellent friction material. The use of a composition in accordance with the present invention, to which a small amount of powdered expanded perlite has been added, will leave a very thin coating of powdered friction material on the surfaces of floors to markedly reduce the slipperiness of such floors.

DESCRIPTION OF THE PREFERRED EMBODIMENT

A preferred composition in accordance with the present invention includes, as a major ingredient, a comminuted sphagnum moss with which has been thoroughly mixed minor amounts of powdered calcined gypsum and powdered heat expanded perlite. Preferred proportions are approximately one part of powdered calcined gypsum and approximately 1 part of heat expanded and powdered perlite both by volume to 12 parts by volume of the sphagnum moss. These portions are approximate only. For example, in most instances, three-fourths part of powdered gypsum to 12 parts of sphagnum moss by volume will render the composition sufficiently fire resistant, but for safety purposes, at least 1 part of the calcined gypsum to 12 parts of the sphagnum moss is preferably employed. The amount of the powdered calcined gypsum can be further increased with some increase in fire resistivity up to approximately 1½ parts by volume of the gypsum to 12 parts of the sphagnum moss by volume without substantially affecting the grease and oil absorptivity of the composition. Substantial frictional properties are imparted to smooth floors by approximately one-half part by volume of the expanded perlite to 12 parts of sphagnum moss and such material may be employed in amounts up to about 2 parts by volume of the expanded perlite to 12 parts by volume of the sphagnum moss. Other friction materials such as powdered pumice or tuff can be employed in approximately the same proportions.

The sphagnum moss employed may be the product sold commercially as peat moss for a ground cover or for a mixture with garden soil. As is well known, the commercial sphagnum moss is a slightly compressed baled material made up of relatively small particles of the moss. It is possible to employ this material substantially in the form received by subjecting it to a simple stirring of tumbling operation to liberate the particles from each other. The proportions given above also apply to such sphagnum moss. It is preferred, however, to reduce the average size of the particles of the moss by a mild comminuting operation in either chopper or hammer mill. Thus a preferred material is made up of fibrous particles most of which are less than one thirty-second of an inch in diameter and less than one-sixteenth of an inch in length, although some of the particles of the fibrous material which may have lengths as long as one-fourth or three-eights of an inch. In general, substantially all of these particles are the type that will pass through a standard 12 or 14 mesh screen or at least through a standard 10 mesh screen. The sphagnum moss is sufficiently friable that rapid vibration of such a screen upon which the sphagnum moss, as received, is positioned, will reduce about all of such moss to a particle size which enables such particles to pass through the screen. This is, however, a more expensive and time consuming operation than the comminuting operation above described.

The powdered calcined gypsum can be mixed with the comminuted sphagnum moss by employing any of several types of commercial mixers. A horizontal mixer having a stationary casing and mixing blades rotated about a central horizontal axis has proved to be effective. The sphagnum moss, as received, usually contains sufficient moisture that the particles of finely divided calcined gypsum adhere to and coat the surfaces of the particles of the sphagnum moss, thus rendering such particles fire resistant.

The powdered friction material can be mixed with the sphagnum moss at the same time as the powdered calcined gypsum and this is usually done. In fact, it is possible to buy commercial gypsum plaster which contains a mixture of powdered calcined gypsum and heat expanded perlite as an aggregate in proportions suitable for mixing with the sphagnum moss of the present application. Such plaster contains very small amounts of other materials such as substances which delay the setting time of the calcined gypsum, but these materials do not deleteriously affect the composition.

When the plaster composition discussed above constitute the source of the powdered calcined gypsum and friction material, a small amount of this material may be in the form of friable agglomerates which may appear as visible pellets in the compound. These particles may have a size up to or greater than one-sixteenth inch in diameter, but do not interfere with the operation of the composition.

A specific composition had the appearance of a sphagnum moss made up of particles somewhat smaller than those in commercial sphagnum moss and of a somewhat lighter brown color than this material as received, and had visible pellets of the plaster composition dispersed throughout the particles of the moss. In use, sufficient amount of this material is deposited upon the floor, either as a thin layer or in a pile, and is swept or brushed over the portion of the floor containing the oil or grease to be removed. The amount of material required will vary with the amount of grease or oil and the user rapidly becomes familiar with the amount required. The sphagnum moss is an extremely absorptive material for grease or oil, and, in general, a lesser amount of material by volume can be employed than is the case with any of the prior art oil and grease absorbing compositions discussed above.

I claim:

1. An oil and grease absorbing composition consisting essentially of a mixture of a major portion of particles of sphagnum moss and as a minor portion sufficient powdered calcined gypsum to render the sphagnum moss fire resistant.

2. The composition of claim 1 which also contains a minor portion of a powdered heat expanded and pulverized perlite.

3. An oil and grease absorbing composition consisting essentially of a mixture of 12 parts by volume of comminuted sphagnum moss and approximately three-fourths to 1½ parts by volume of powdered calcined gypsum.

4. The composition of claim 3 which also contains approximately one-half to 1½ parts by volume of heat expanded and pulverized perlite.

5. The composition of claim 3 in which the sphagnum moss is composed of particles substantially all of which will pass through a standard 10 mesh screen.

* * * * *